US006383585B2

(12) United States Patent
Peiffer et al.

(10) Patent No.: US 6,383,585 B2
(45) Date of Patent: *May 7, 2002

(54) SEALABLE POLYESTER FILM WITH HIGH OXYGEN BARRIER, ITS USE AND PROCESS FOR ITS PRODUCTION

(75) Inventors: Herbert Peiffer, Mainz; Cynthia Bennett, Alzey; Gottfried Hilkert, Saulheim, all of (DE)

(73) Assignee: Mitsubishi Polyester Film GmbH, Wiesbaden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,780

(22) Filed: Mar. 24, 1999

(30) Foreign Application Priority Data

Mar. 25, 1998 (DE) .......................... 198 13 269

(51) Int. Cl.[7] .................. B32B 27/06; B32B 27/36; B32B 31/08; B32B 31/16

(52) U.S. Cl. ............ 428/35.9; 428/336; 428/480; 428/910; 428/458; 264/290.2

(58) Field of Search ................. 421/336, 480, 421/35.9, 910, 694 SL, 694 SG, 458; 264/290.2

(56) References Cited

U.S. PATENT DOCUMENTS

| | | | |
|---|---|---|---|
| 3,515,626 A | 6/1970 | Duffield | 428/325 |
| 3,958,064 A | 5/1976 | Brekken et al. | 428/336 |
| 4,042,569 A | 8/1977 | Bell et al. | 428/480 |
| 4,252,588 A | 2/1981 | McGrail et al. | 430/160 |
| 4,399,179 A | 8/1983 | Minami et al. | 428/212 |
| 4,493,872 A | 1/1985 | Funderburk et al. | 428/332 |
| 4,615,939 A | 10/1986 | Corsi et al. | 428/323 |
| 4,622,237 A | 11/1986 | Lori | 427/40 |
| 5,236,680 A | 8/1993 | Nakazawa et al. | 423/328.1 |
| 5,236,683 A | 8/1993 | Nakazawa et al. | 423/335 |
| 5,242,757 A | 9/1993 | Buisine et al. | 428/480 |
| 5,429,785 A | 7/1995 | Jolliffe | 264/216 |
| 5,453,260 A | 9/1995 | Nakazawa et al. | 423/327.1 |
| 5,468,527 A | 11/1995 | Peiffer et al. | 428/35.7 |
| 5,506,014 A | 4/1996 | Minnick | 428/35.7 |
| 5,885,689 A | * 3/1999 | Hasegawa et al. | 428/141 |
| 5,955,181 A | * 9/1999 | Peiffer et al. | 428/212 |
| 5,976,653 A | * 11/1999 | Collette et al. | 428/36.7 |
| 6,054,212 A | * 4/2000 | Peiffer et al. | 428/336 |

FOREIGN PATENT DOCUMENTS

| | | |
|---|---|---|
| DE | 3801535 | 7/1988 |
| DE | 4306155 | 9/1994 |
| EP | 0 035 835 | 9/1981 |
| EP | 0 061 769 | 10/1982 |
| EP | 0 088 635 | 9/1983 |
| EP | 0 124 291 | 11/1984 |
| EP | 0 135 451 | 3/1985 |
| EP | 0 144 878 | 6/1985 |
| EP | 0 296 620 | 12/1988 |
| EP | 0 347 646 | 12/1989 |
| EP | 0 378 154 | 7/1990 |
| EP | 0 402 861 | 12/1990 |
| EP | 0 490 665 | 6/1992 |
| EP | 0 502 745 | 9/1992 |
| EP | 0 514 129 | 11/1992 |
| EP | 0 515 096 | 11/1992 |
| EP | 0 580 404 | 1/1994 |
| EP | 0 602 964 | 6/1994 |
| EP | 0 604 057 | 6/1994 |

(List continued on next page.)

OTHER PUBLICATIONS

Ullmann's Encyclopedia of Industrial Chemistry, 5th Edition, vol. A 11: Films, pp. 85–111, May 1994.*

Patent Abstracts of Japan, vol. 1996, No. 10, Oct. 31, 1996, JP 08 156 183 A, Jun. 18, 1996.

Patent Abstracts of Japan, vol. 1996, No. 02, Feb. 29, 1996, JP 07 276492 A, Oct. 24, 1995.

Weiss, J., Paramters that influence the barrier properties of metallized polyester and polypropylene films, Thin Solid Flms, vol. 204, 203–216 (1991).

F. Kimura et al., "FTIR Spectroscopic Study on Crystallization Process of Poly (ethylene–2,6–naphthalate)", Journal of Polymer Science, vol. 35, pp. 2741–2747, (1997).

Bursch et al., "Biaxially Oriented Polyester Film for SMD Condensers—Made by Extrusion Followed by Biaxial Stretching and Heat Fixing to Give Specified Shrinkage Parameters in the Machine Direction and Transverse Directon." Derwent Abstract, WPI Acc. No. 98–194495/199818 (1998).

Database WPI, Section Ch, Week 9522, Derwent Publications Ltd., London, GB; AN 95–166886, XP002114408 & JP 07 088592 A (Toray Indus., Inc.) (Apr. 4, 1995).

Database WPI, Section Ch, Week 9615, Derwent Publications Ltd., London, GB; AN 96–148338, XP002114377 & JP 08 03679 A (Toray Indus., Inc.) (Feb. 6, 1996).

*Primary Examiner*—Paul Thibodeau
*Assistant Examiner*—Ramsey Zacharia
(74) *Attorney, Agent, or Firm*—Finnegan, Henderson, Farabow, Garrett & Dunner, L.L.P.

(57) ABSTRACT

The application discloses a sealable biaxially oriented polyester film having a base layer B at least 80% by weight of which is composed of a thermoplastic polyester, and having two outer layers A and C, wherein the outer layer A is composed of a polymer or of a mixture of polymers which comprises at least 40% by weight of ethylene 2,6-naphthalate units and up to 60% by weight of ethylene terephthalate units and/or units from cycloaliphatic or aromatic diols and/or dicarboxylic acids, and the opposite outer layer C is sealable and has a sealing initialization temperature of from about 100 to 200° C. The film has low atmospheric oxygen transmission. It is particularly suitable for packaging applications, specifically for packaging foods and other consumable items.

24 Claims, No Drawings

FOREIGN PATENT DOCUMENTS

| | | |
|---|---|---|
| EP | 0 609 060 | 8/1994 |
| EP | 0 612 790 | 8/1994 |
| EP | 0 659 810 | 6/1995 |
| EP | 0 663 286 | 7/1995 |
| EP | 0 685 509 | 12/1995 |
| EP | 0 707 979 | 4/1996 |
| EP | 0 236 945 | 9/1997 |
| EP | 0 826 478 | 3/1998 |
| EP | 0 836 936 | 4/1998 |
| EP | 0 849 075 | 6/1998 |
| EP | 0 865 907 | 9/1998 |
| WO | WO 88/10188 | 12/1988 |
| WO | WO 94/13476 | 6/1994 |
| WO | WO 94/13481 | 6/1994 |
| WO | WO 98/13414 | 4/1998 |
| WO | WO 98/13415 | 4/1998 |

\* cited by examiner

SEALABLE POLYESTER FILM WITH HIGH OXYGEN BARRIER, ITS USE AND PROCESS FOR ITS PRODUCTION

The invention relates to a biaxially oriented polyester film having a base layer B at least 80% by weight of which is composed of a thermoplastic polyester, and having two outer layers A and C. The invention also relates to the use of the film and to a process for its production.

BACKGROUND OF THE INVENTION

In many cases, there is demand for food and drink packaging to have a high barrier effect with respect to gases, water vapor and flavors. For this reason, use is usually made of polypropylene films which have been metalized or have been coated with polyvinylidene chloride (PVDC). However, metalized polypropylene films are not transparent and are therefore not used in cases where the view of the contents is likely to have added promotional effect. Although films coated with PVDC are transparent, the coating, like the metalizing, takes place in a second operation which makes the packaging markedly more expensive. Ethylene-vinyl alcohol copolymers (EVOH) likewise exhibit a strong barrier effect. However, films modified with EVOH are particularly highly sensitive to moisture, and this limits their range of application. In addition, because of their poor mechanical properties they have relatively high thickness or have to be laminated with other materials at high cost, and they are also difficult to dispose of after use. Many packaging systems, furthermore, demand sealability of the films as well as an effective barrier.

It is therefore an object of the present invention to provide a transparent, sealable, biaxially oriented polyester film which has a high oxygen barrier, is simple and cost-effective to produce, has the good physical properties of the known films, and does not give rise to disposal problems.

DESCRIPTION OF THE INVENTION

The object is achieved by means of a biaxially oriented polyester film having at least three layers and having a base layer B at least 80% by weight of which is composed of (at least) one thermoplastic polyester, and having two outer layers A and C, wherein the outer layer A is composed of a polymer or a mixture of polymers which comprises at least 40% by weight of ethylene 2,6-naphthalate units and up to 40% by weight of ethylene terephthalate units and/or up to 60% by weight of units from aliphatic, including cycloaliphatic, or aromatic diols and/or dicarboxylic acids, and the opposite outer layer C has a sealing initialization temperature of $\leq 200°$ C., preferably $\leq 130°$ C., or between from about 100° C. to 200° C. The novel film generally has an oxygen permeability of less than 80 cm$^3$/(m$^2$ bar d), preferably less than 75 cm$^3$/(m$^2$ bar d), particularly preferably less than 70 cm$^3$/(m$^2$ bar d). The novel film is preferably transparent.

Preference is given to a polyester film in which the polymers of the outer layer A comprise at least 65% by weight of ethylene 2,6-naphthalate units and up to 35% by weight of ethylene terephthalate units. Among these, particular preference is in turn given to a polyester film of the type in which the polymers of the outer layer A comprise at least 70% by weight of ethylene 2,6-naphthalate units and up to 30% by weight of ethylene terephthalate units. The outer layer A may, however, also be composed completely of ethylene 2,6-naphthalate polymers.

Examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of suitable aromatic diols are those of the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—. Besides these, bisphenols of the formula HO—C$_6$H$_4$—C$_6$H$_4$—OH are also very suitable.

Preferred aromatic dicarboxylic acids are benzenedicarboxylic acids, naphthalenedicarboxylic acids (for example naphthalene-1,4- or -1,6-dicar-boxylic acid), biphenyl-x,x'-dicarboxylic acids (in particular biphenyl-4,4'-dicarboxylic acid), diphenylacetylene-x,x'-dicarboxylic acids (in particular diphenylacetylene4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphaticdicarboxylic acids, the C$_3$–C$_{19}$-alkanedioic acids are particularly suitable, where the alkane moiety may be straight-chain or branched.

The present invention also provides a process for producing this film. It encompasses
  a) producing a film from base and outer layers A and C by coextrusion,
  b) biaxial orientation of the film and
  c) heat-setting of the oriented film.

To produce the outer layer A, it is expedient to feed granules of polyethylene terephthalate and polyethylene 2,6-naphthalate directly to the extruder in the desired mixing ratio. At about 300° C. and with a residence time of about 5 min, the two materials can be melted and can be extruded. Under these conditions, transesterification reactions can occur in the extruder and during these copolymers are formed from the homopolymers.

The polymers for the base layer B are expediently fed in via another extruder. Any foreign bodies or contamination which may be present can be filtered off from the polymer melt before extrusion. The melts are then extruded through a coextrusion die to give flat melt films and are layered one upon the other. The coextruded film is then drawn off and solidified with the aid of a chill roll and other rolls if desired.

The biaxial orientation is generally carried out sequentially. For the sequential stretching, it is preferable to orient firstly in a longitudinal direction (i.e. in the machine direction) and then in a transverse direction (i.e. perpendicularly to the machine direction). This causes an orientation of the molecular chains. The orientation in a longitudinal direction may be carried out with the aid of two rolls running at different speeds corresponding to the stretching ratio to be achieved. For the transverse orientation, use is generally made of an appropriate tenter frame.

The temperature at which the orientation is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

During the subsequent heat-setting, the film is held for from 0.1 to 10 s at a temperature of from 150 to 250° C. The film is then wound up in a conventional manner.

A great advantage of this process is that it is possible to feed the extruder with granules, which do not block the machine.

The base layer B of the film is preferably composed to an extent of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclo-hexane and terephthalic acid (=poly-1,4-cyclohexanedimethylene terephthalate, PCDT), and also from ethylene glycol, naphthalene-2,6-dicarboxylic acid and biphenyl4,4'-dicarboxylic acid (=polyethylene 2,6-naphthalate bibenzoate, PENBB). Particular preference is given to polyesters which are composed to an extent of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—$(CH_2)_n$—OH, where n is an integer from 3 to 6, branched aliphatic glycols having up to 6 carbon atoms, aromatic diols of the formula HO—$C_6H_4$—X—$C_6H_4$—OH where X is —$CH_2$—, —$C(CH_3)_2$—, —$C(CF_3)_2$—, —O—, —S—or —$SO_2$—,or bisphenols of the formula HO—$C_6H_4$—$C_6H_4$—OH.

The dicarboxylic acid comonomer units are preferably derived from benzenedicarboxylic acids, naphthalenedicarboxylic acids, biphenyl-x,x'-dicarboxylic acids (in particular biphenyl4,4'-dicarboxylic acid), cyclohexane-dicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1$–$C_{16}$-alkane-dicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and thediols.

For processing the polymers, it has proven useful to select the polymers for the base layer and the outer layer(s) in such a way that the viscosities of the respective polymer melts do not differ excessively. Otherwise it is likely that there will be flow disturbances or streaks on the finished film. To describe the viscosity ranges of the two melts, use is made of a modified solution viscosity (SV). The solution viscosity is a measure of the molecular weight of the respective polymer and correlates with the melt viscosity. The chemical make-up of the polymer used may result in other correlations. For commercially available polyethylene terephthalates which are suitable for producing biaxially oriented films, the SVs are in the range from 600 to 1000. To ensure satisfactory film quality, the SV of the copolymers for the outer layer should be in the range from 300 to 900, preferably between 400 and 800, in particular between 500 and 700. If desired, a solid phase condensation may be carried out on the respective granules in order to adjust the SV of the materials as necessary. It is a general rule that the melt viscosities of the polymer melts for base and outer layer(s) should differ by not more than a factor of 5, preferably not more than a factor of from 2 to 3.

The polymers for the outer layer A may be prepared in three different ways:
  a) In the copolycondensation, terephthalic acid and naphthalene-2,6-dicarboxylic acid are placed in a reactor together with ethylene glycol, and polycondensed to give a polyester, using the customary catalysts and stabilizers. The terephthalate and naphthalate units are then randomly distributed in the polyester.
  b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.
  c) PET and PEN are mixed as granules in the desired ratio, and the mixture is fed to the extruder for the outer layer. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer are identical with those of the outer layer. These are either directly admixed with the base layer during extrusion or are in any case present in the film due to addition of regenerated material. The proportion of these copolymers in the base layer is selected in such a way that the base layer has a partially crystalline character.

The novel film exhibits a surprisingly high oxygen barrier. If, in contrast, the polymers used for the outer layer A comprise less than 40% by weight of ethylene 2,6-naphthalate units and more than 40% by weight of ethylene terephthalate units, then in some cases, although the film has somewhat lower oxygen transmission than a standard polyester film (composed to an extent of 100% by weight of polyethylene terephthalate), the transmission is still much too high. It has even been found that the oxygen barrier is poorer than in a standard polyester film if the outer layer comprises from 30 to 40% by weight of ethylene 2,6-naphthalate units and from 60 to 70% by weight of ethylene terephthalate units. However, even under these circumstances there may be advantage in a film having an outer layer A which comprises at least 5%, preferably between 5 and 40%, by weight of ethylene 2,6-naphthalate units and more than 40% by weight of ethylene terephthalate units, if the oxygen barrier does not play a decisive part in the application concerned.

It is expedient if, besides the base layer, the outer layer A is also partly crystalline. Surprisingly, it has been found that the crystallinity of the outer layers in particular influences the barrier properties of the film. If the crystallinity is high, the barrier is also high. The crystallinity of the film can be determined using FTIR spectroscopy, and for determining the crystallinity of the outer layer the measurements should be made in ATR mode. The crystallinity is shown by the presence of specific bands. The form of the crystallites (α form or β form) does not appear to be critical. For copolyesters containing ethylene units, the bands for the symmetrical CH-bond vibrations are at 2990 and 2971 cm$^{-1}$ (α form) and 2998 and 2971 cm$^{-1}$ (β form), respectively [see F. Kimura et al., Journal of Polymer Science: Polymer Physics, Vol. 35, pp. 2041–2047, 1997].

The base layer B and the outer layers A and C may, in addition, comprise customary additives, such as stabilizers and antiblocking agents. They are expediently added to the polymer or to the polymer mixture before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc and manganese salts of the dicarboxylic acids used, carbon black, titanium dioxide, kaolin, crosslinked polystyrene particles or crosslinked acrylate particles.

The additives selected may also be mixtures of two or more different antiblocking agents or mixtures of antiblocking agents of the same make-up but of different particle size. The particles may be added to the individual layers in the customary concentrations, e.g. as glycolic dispersion during the polycondensation or via masterbatches -during extrusion. Pigment concentrations of from 0.0001 to 5% by weight have proven particularly suitable. A detailed description of the antiblocking agents is found, for example, in EP-A-0 602 964.

The film may be coated and/or corona- or flame-pretreated to establish other desired properties. Typical coatings are layers which promote adhesion, are antistatic, improve slip or have release action. These additional layers may be applied to the film by in-line coating using aqueous dispersions, before the transverse orientation.

The novel polyester film also comprises the second sealable outer layer C. The structure, thickness and make-up of the second outer layer C may be selected independently of the outer layer A already present, and the second outer layer C may likewise comprise the abovementioned polymers or polymer mixtures, but these are not substantially identical with those of the first outer layer. A precondition for achieving the sealability with the stated sealing initialization temperature of ≦130° C. is that the outer layer C, in contrast to the outer layer A, is amorphous.

When using the polymers given for the outer layer A, this is achieved by the presence of a proportion of from 25 to 75% by weight of ethylene 2,6-naphthalate units and a proportion of from 75 to 25% by weight of ethylene terephthalate units and/or of up to 50% by weight of units from cycloaliphatic or aromatic diols and/or dicarboxylic acids. In a preferred embodiment, the proportion of ethylene 2,6-naphthalate units is from 30 to 70% by weight, and in a particularly preferred embodiment it is from 35 to 65% by weight.

The hot-sealable layer may, however, also be composed of other polyester resins. Preference is given to copolyester resins which have been derived from aromatic dicarboxylic acids, such as terephthalic acid, isophthalic acid and hexahydroterephthalic acid, and from glycols, such as ethylene glycol, diethylene glycol, triethylene glycol or neopentyl glycol. Typical copolyesters which permit sealability with the sealing initialization temperature given are made of ethylene terephthalate and ethylene isophthalate, the proportion of ethylene terephthalate being from 50 to 90% by weight and the proportion of ethylene isophthalate being from 50 to 10% by weight. Preferred ranges are from 65 to 85% by weight of ethylene terephthalate and from 35 to 15% by weight of ethylene isophthalate, as described, for example, in EP-A-0 515 096 and EP-A-0 035 835.

The second outer layer C may also comprise other common outer layer polymers.

Between the base layer B and the outer layers A and C, there may also be an intermediate layer if desired. It may be composed of the polymers described for the base layers. In a particularly preferred embodiment, it is composed of the polyester used for the base layer. It may also comprise the customary additives described. The thickness of the intermediate layer is generally greater than 0.3 μm and is preferably in the range from 0.5 to 15 μm, in particular from 1.0 to 10 μm.

The thickness of the outer layers A and C is generally greater than 0.1 μm and is preferably in the range from 0.2 to 6.0 μm, more preferably in the range from 0.3 to 5.5 μm, in particular from 0.3 to 5.0 μm. It is possible for the outer layers to have identical or different thicknesses.

The total thickness of the novel polyester film may vary within wide limits and depends on the application envisaged. It is preferably from 4 to 100 μm, in particular from 5 to 50 μm, preferably from 6 to 30 μm, the base layer preferably presenting a proportion of from about 40 to 90% of the total thickness.

A further advantage is that the production costs of the novel film are only insignificantly greater than those of a film made from standard polyester raw materials. The other properties of the novel film which are relevant to processing and use remain essentially unchanged or are even improved. In addition, it has been ensured that regenerated material can be used in a proportion of up to 50% by weight, preferably from 10 to 50% by weight, based on the total weight of the film in each case, in the production of the film without significant adverse effect on its physical properties.

The film has excellent suitability for packaging foods and other consumable items.

For this intended use, the films are usually metalized or ceramically (e.g. SiO$_x$, Al$_x$O$_y$, Na$_2$SiO$_4$, etc.) coated. Surprisingly, it has been found that the barrier is significantly better than in conventional metalized or ceramically coated polyester films if the metal layer or ceramic layer is applied to the PEN-containing outer layer A of the novel film. Conventional metalized polyester films have barrier values of >0.6 cm$^3$/m$^2$·d·bar, whereas the metalized novel films have barrier values of <0.1 cm$^3$/m$^2$·d·bar. It has generally been found that, whatever the type of coating, the barrier effect of the novel films is better by a factor of 10 than that of conventional polyester films.

It has been found here that even a low outer layer thickness of <1.5 μm, preferably <1.0 μm, is sufficient to create the good barrier mentioned.

Other application sectors for the novel films are can liners, lid films (e.g. lids for yogurt cups, etc.) and thermo-transfer ribbons.

The following methods were used to characterize the raw materials and the films:

The oxygen barrier was measured using a Mocon Modern Controls (USA) OX-TRAN 2/20 in accordance with DIN 53 380, Part 3.

The SV (solution viscosity) was determined by dissolving a specimen of polyester in a solvent (dichloroacetic acid, 1% strength by weight solution). The viscosity of this solution and that of the pure solvent were measured in an Ubbelohde viscometer. The quotient (relative viscosity $\eta_{rel}$) was determined from the two values, 1.000 was subtracted from this, and the value multiplied by 1000. The result was the SV.

The coefficient of friction was determined according to DIN 53 375, 14 days after production.

The surface tension was determined using the "ink method" (DIN 53 364).

The haze of the film was measured in accordance with ASTM-D 1003-52. The Hölz haze was determined by a method based on ASTM-D 1003-52, but in order to utilize the most effective measurement range, measurements were made on four pieces of film laid one on top of the other, and a 1° slit diaphragm was used instead of a 4° pinhole.

Gloss was determined in accordance with DIN 67 530. The reflectance was measured as an optical characteristic value for a film surface. Based on the standards ASTM-D 523-78 and ISO 2813, the angle of incidence was set at 20° or 60°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

Determination of the sealing initialization temperature

Hot-sealed specimens (seal seam 20 mm×100 mm) were produced with the Brugger HSG/ET sealing apparatus, by sealing a film at different temperatures with the aid of two heated sealing jaws at a sealing pressure of 10 N/cm$^2$ and a sealing time of 0.5 s. From the sealed specimens, test strips of 15 mm width were cut. The T-seal seam strength was measured as in the determination of seal seam strength. The sealing initialization temperature is the temperature at which a seal seam strength of at least 0.5 N/15 mm is achieved.

The following examples illustrate the invention. The products used (trademarks and manufacturers) are given only once in each case, and then relate also to the examples which follow.

EXAMPLE 1

The polymer for the outer layer A was prepared by copolycondensation. For this, dimethyl terephthalate and 2,6-dimethyl naphthalenedicarboxylate were mixed in a reactor in a molar ratio of 0.54:1.00 (corresponding to a make-up of 30% by weight of ethylene terephthalate units and 70% by weight of ethylene 2,6-naphthalate units in the final copolymer), and then mixed with ethylene glycol and, as catalyst, 300 ppm of manganese acetate. The transesterification was then carried out with stirring at from 160 to 250° C., at atmospheric pressure, and the methanol obtained during this process was distilled off. An equimolar amount of phosphoric acid, as stabilizer, and 400 ppm of antimony trioxide, as catalyst, were then added. The polycondensation was then carried out with stirring at 280° C. and a pressure of less than 1 mbar. The molecular weight achieved could be determined by measuring the torque on the stirrer. After the reaction, nitrogen pressure was used to discharge the melt from the reactor, and it was then pelletized.

EXAMPLE 2

Commercially available polyethylene terephthalate pellets and polyethylene 2,6-naphthalate pellets were used. In each case, the pellets were crystallized and dried for about 4 h at a temperature of about 160° C. The two materials in a ratio of 30:70 (30% by weight of polyethylene terephthalate and 70% by weight of polyethylene 2,6-naphthalate) were then placed in a mixer, where they were homogenized by stirring. The mixture was then passed to a twin-screw compounder (ZSK from Werner and Pfleiderer, Stuttgart), where it was extruded at a temperature of about 300° C. and with a residence time of about 3 min. The melt was extruded and chipped. A copolymer was produced in the extrusion by reaction between the polyethylene terephthalate and polyethylene 2,6-naphthalate.

EXAMPLE 3

Example 2 was repeated, but, for production of the film, chips of polyethylene terephthalate and of polyethylene 2,6-naphthalate were fed in a mixing ratio of 3:7 directly to the single-screw extruder, where the two materials were extruded at about 300° C. The melt was filtered and extruded through a coextrusion die to give a flat film, and laid as outer layer onto the base layer. The coextruded film was discharged across the die lip and solidified on a chill roll. The residence time of the two polymers in the extrusion was about 5 min. Here, too, the copolymer was produced during extrusion under the conditions given.

EXAMPLE 4

Chips of polyethylene terephthalate were dried at 160° C. to a residual moisture of less than 50 ppm and fed to the extruder for the base layer. Besides this, chips of polyethylene terephthalate and polyethylene 2,6-naphthalate (in a weight ratio of 3:7) were likewise dried at 160° C. to a residual moisture of 50 ppm and fed to the two extruders for the outer layers. The extruder conditions for the outer layers were as in Example 3.

A transparent three-layer A/B/C film having an overall thickness of 12 μm was then produced by coextrusion followed by stepwise orientation in the longitudinal and transverse directions. Each of the outer layers has a thickness of 2.0 μm.

Base layer B:
  95% by weight of polyethylene terephthalate (RT 49 from Hoechst AG) having an SV of 800 and
  5% by weight of masterbatch made from 99% by weight of polyethylene terephthalate and 1.0% by weight of silica particles (SYLOBLOC® 44 H from Grace) having an average particle size of 4.5 μm.

Outer layer A:
  70% by weight of polyethylene 2,6-naphthalate (POLYCLEAR®N 100 prepolymer from Hoechst AG) having an SV of 600,
  20% by weight of polyethylene terephthalate having an SV of 800 and
  10% by weight of masterbatch made from 99.0% by weight of polyethylene terephthalate and 1.0% by weight of silica particles having an average particle size of 2.0 μm.

Outer layer C:
  Copolymer made from
  82% by weight of ethylene isophthalate and
  18% by weight of ethylene terephthalate The individual steps were:

| Extrusion | Temperatures: | Outer layer A: 300° C.<br>Outer layer C: 250° C.<br>Base layer: 300° C. |
|---|---|---|
| | Temperature of the take-off roll: | 30° C. |
| | Die gap width: | 1 mm |
| | Temperature of the take-off roll: | 30° C. |
| Longitudinal stretching | Temperature:<br>Longitudinal stretching ratio: | 85–135° C.<br>4.0:1 |
| Transverse stretching | Temperature:<br>Transverse stretching ratio: | 85–135° C.<br>4.0:1 |
| Setting | Temperature: | 230° C. |

The film had the required oxygen barrier and sealed on side C.

EXAMPLE 5

In a manner similar to that of Example 4, a three-layer film having an overall thickness of 12 $\mu$m was produced by coextrusion. The outer layer A had a thickness of 2.0 $\mu$m, the outer layer C a thickness of 1.5 $\mu$m.

Base layer:
  100% by weight of polyethylene terephthalate having an SV of 600

Outer layer A:
  70% by weight of polyethylene 2,6-naphthalate having an SV of 600,
  20% by weight of polyethylene terephthalate having an SV of 800 and
  10% by weight of masterbatch made from 99.0% by weight of polyethylene terephthalate and 1.0% by weight of silica particles having an average particle size of 2.0 $\mu$m.

Outer layer C:
  50% by weight of polyethylene 2,6-naphthalate having an SV of 600 and
  50% by weight of polyethylene terephthalate having an SV of 800.

The process conditions for all layers were as in Example 4.

EXAMPLE 6

A coextruded film having the recipe of Example 5, where outer layer A was 2.0 $\mu$m thick and had the following make-up:

90% by weight of polyethylene 2,6-napthalate having an SV of 600 and
  10% by weight of masterbatch made from 99.0% by weight of polyethylene terephthalate and 1.0% by weight of silica particles having an average particle size of 1.0 $\mu$m, was produced under the process conditions of Example 4.

EXAMPLE 7

A coextruded film having the recipe of Example 5, where outer layer A was 2.5 $\mu$m thick and had the following make-up:

90% by weight of polyethylene 2,6-naphthalate having an SV of 600 and
  10% by weight of masterbatch made from 99.0% by weight of polyethylene 2,6-naphthalate having an SV of 600 and 1.0% by weight of silica particles having an average particle size of 1.0 $\mu$m, was produced under the process conditions of Example 4, but the temperatures of longitudinal and transverse stretching were now raised by about 10° C.

EXAMPLE 8

A three-layer coextruded film having a base layer and two outer layers was produced in a manner similar to that of Example 5. The overall thickness of the film was 12 $\mu$m. Outer layer A had a thickness of 3 $\mu$m, and outer layer C of 1.5$\mu$m.

Base layer:
  100% by weight of polyethylene terephthalate having an SV of 800

Outer layer A:
  100% by weight of polyethylene 2,6-naphthalate having an SV of 800

Outer layer C:
  50% by weight of polyethylene 2,6-naphthalate having an SV of 600 and
  50% by weight of polyethylene terephthalate having an SV of 800.

The process conditions for all layers were as given in Example 7.

EXAMPLE 9

A three-layer film was produced as described in Example 5, with the single exception that the thickness of outer layers A and C was only 1.0 $\mu$m.

Comparative Example 1C

A film was produced as in Example 4. For outer layer A, however, use was made of a copolyester made of 82% by weight of ethylene terephthalate and 18% by weight of ethylene isophthalate.

The film did not have the barrier required.

The compositions and properties of the films produced in Examples 4 to 12 and 1C are given in Tables 1 and 2.

TABLE 1

| Example No. | Ethylene 2,6-naph-thalate units in outer layer A (in % by weight) | Ethylene terephthalate units in outer layer A (in % by weight) | Ethylene isophthalate units in outer layer A (in % by weight) |
|---|---|---|---|
| 4 | 70 | 30 | 0 |
| 5 | 70 | 30 | 0 |
| 6 | 90 | 10 | 0 |
| 7 | 100 | 0 | 0 |
| 8 | 100 | 0 | 0 |
| 9 | 100 | 0 | 0 |
| 1C | 0 | 82 | 18 |

TABLE 2

| Example No. | Film thickness (μm) | Outer layer thickness A/C (μm) | Film structure | Oxygen permeability (cm³/(m² bar d)) | Gloss (60° angle of measurement) Side A | Gloss (60° angle of measurement) Side C | Haze | sealing initialization temperature C to C ° C. |
|---|---|---|---|---|---|---|---|---|
| 4 | 12 | 2.0/2.0 | ABC | 70 | 175 | 175 | 2.5 | 100 |
| 5 | 12 | 2.0/1.5 | ABC | 80 | 174 | 175 | 2.6 | 110 |
| 6 | 12 | 2.0/1.5 | ABC | 65 | 176 | 175 | 2.5 | 110 |
| 7 | 12 | 2.5/1.5 | ABC | 55 | 155 | 155 | 4.0 | 110 |
| 8 | 12 | 3.0/1.5 | ABC | 45 | 160 | 155 | 4.0 | 110 |
| 9 | 12 | 1.0/1.0 | ABC | 62 | 160 | 165 | 3.5 | 120 |
| 10 | 12 | 3.0/3.0 | ABC | 102 | 145 | 160 | 3.0 | 100 |

What is claimed is:

1. A sealable, biaxially oriented polyester film comprising:

a base layer B, at least 80% by weight of which is composed of a thermoplastic polyester;

an outer layer A, composed of a polymer or of a mixture of polymers comprising: at least 40% by weight of ethylene 2,6-naphthalate units; optionally up to 40% by weight of ethylene terephthalate units; and optionally up to 60% by weight of units from aliphatic diols, cycloaliphatic diols, aromatic diols, aliphatic dicarboxylic acids, cycloaliphatic dicarboxylic acids, aromatic dicarboxylic acids, or a combination thereof; and an opposite outer layer C having a sealing initialization temperature of ≦130° C., wherein the compositions of layers A and C are not identical, and wherein layer C is amorphous.

2. A film as claimed in claim 1, wherein the outer layer A comprises at least 65% by weight of ethylene 2,6-naphthalate units.

3. A film as claimed in claim 1, wherein the outer layer A comprises at least 70% by weight of ethylene 2,6-naphthalate units.

4. A film as claimed in claim 1, wherein the film has an oxygen permeability of less than 80 cm³/(m² bar d).

5. A film as claimed in claim 1, wherein the film has an oxygen permeability of less than 75 cm³/(m² bar d).

6. A film as claimed in claim 1, wherein the film has an oxygen permeability of less than 70 cm³/(m² bar d).

7. A film as claimed in claim 1, wherein the outer layer C is amorphous and composed of copolyesters comprising two or more monomeric building blocks selected from the group consisting of naphthalene-2,6-dicarboxylic acid, terephthalic acid, isophthalic acid, hexahydroterephthalic acid, ethylene glycol, diethylene glycol, triethylene glycol, and neopentyl glycol.

8. A film as claimed in claim 1, wherein the outer layers A and C have a thickness of from 0.2 to 6 μm.

9. A film as claimed in claim 1, wherein the outer layers A and C have a thickness of from 0.3 to 5.5 μm.

10. A film as claimed in claim 1, wherein the outer layers A and C have a thickness of from 0.3 to 5.0 μm.

11. A film as claimed in claim 1, wherein the film has only three layers A, B, and C.

12. A film as claimed in claim 1, wherein at least one of the outer layers has been pigmented.

13. A film as claimed in claim 1, wherein at least one side of the film has been corona-treated.

14. A film as claimed in claim 1, wherein at least one side of the film has been in-line coated.

15. A process for producing a sealable, biaxially oriented polyester film of claim 1, which comprises:

(A) coextruding a film from the base layer and from the two outer layers;

(B) orienting the film biaxially; and (C) heat-setting the oriented film.

16. The process as claimed in claim 15, wherein the coextrusion step further comprises:

(A) feeding a desired mixing ratio of granules of outer layer starting materials into an extruder;

(B) heating the granules for about five minutes at about 300° C. so that the materials are converted into a melt;

(C) feeding, into a second extruder, the polymers for the base layer;

(D) heating the polymers for the base layer to form a second melt;

(E) filtering any foreign bodies or contamination present in either of the melts;

(F) extruding the two melts through a coextrusion die to give flat melt films;

(G) layering one flat melt film upon the other to form a coextruded film;

(H) drawing off the coextruded film; and (I) solidifying the coextruded film with the aid of a chill roll and other rolls, if desired, forming a film.

17. The process as claimed in claim 15, wherein the orientation step further comprises:

(A) orienting the film firstly in a longitudinal direction using two rolls running at different speeds corresponding to a longitudinal stretching ratio desired to be achieved; and (B) orienting the film secondly in a transverse direction using a tenter frame to achieve a desired transverse stretching ratio.

18. The process as claimed in claim 17, wherein the longitudinal orientation is carried out at from 80 to 130° C. and the transverse orientation is carried out at from 90 to 150° C.

19. A method for packaging foods and other consumable items, comprising packaging said foods and other consumable items in a film as claimed in claim 1.

20. A method of lining a can, comprising lining the can with a film as claimed in claim 1.

21. A method for the production of a lid film, comprising producing the lid film from a film as claimed in claim 1.

22. A method for the production of a thermo-transfer ribbon, comprising producing the thermo-transfer ribbon from a film as claimed in claim 1.

23. A film as claimed in claim 1, further comprising an intermediate layer located between the base layer and the outer layers A and C.

24. A transparent, biaxially oriented polyester film comprising:
- a base layer B, at least 80% by weight of which is composed of a thermoplastic polyester;
- an outer layer A, composed of a polymer or of a mixture of polymers comprising: at least 5% by weight of ethylene 2,6-naphthalate units; more than 40% by weight of ethylene terephthalate units; and 0 to <55% by weight of units from aliphatic diols, cycloaliphatic diols, aromatic diols, aliphatic dicarboxylic acids, cycloaliphatic dicarboxylic acids, aromatic dicarboxylic acids, or a combination thereof; and
- an opposite outer layer C having a sealing initialization temperature of from about 100 to 200° C.,
- wherein the compositions of layers A and C are not identical, and wherein layer C is amorphous.

* * * * *